US012596202B2

(12) United States Patent
Zhang et al.

(10) Patent No.: US 12,596,202 B2
(45) Date of Patent: Apr. 7, 2026

(54) DIRECT WELL-TIE METHOD FOR DEPTH-DOMAIN LOGGING AND SEISMIC DATA

(71) Applicant: Chengdu University of Technology, Chengdu (CN)

(72) Inventors: Jie Zhang, Chengdu (CN); Xuehua Chen, Chengdu (CN); Wei Jiang, Chengdu (CN); Bingnan Lv, Chengdu (CN); Junjie Liu, Chengdu (CN); Xiaomin Jiang, Chengdu (CN)

(73) Assignee: CHENGDU UNIVERSITY OF TECHNOLOGY, Chengdu (CN)

( * ) Notice: Subject to any disclaimer, the term of this patent is extended or adjusted under 35 U.S.C. 154(b) by 442 days.

(21) Appl. No.: 18/164,583

(22) Filed: Feb. 4, 2023

(65) Prior Publication Data

US 2023/0258839 A1 Aug. 17, 2023

(30) Foreign Application Priority Data

Feb. 25, 2022 (CN) .......................... 202210180144.4

(51) Int. Cl.
*G01V 1/50* (2006.01)
*G01V 1/28* (2006.01)

(52) U.S. Cl.
CPC ............... *G01V 1/50* (2013.01); *G01V 1/282* (2013.01)

(58) Field of Classification Search
CPC .... G01V 1/50; G01V 1/282; G01V 2210/614; G01V 11/00
See application file for complete search history.

(56) References Cited

U.S. PATENT DOCUMENTS

2006/0256657 A1 * 11/2006 Robinson ................. G01V 1/40
367/38
2019/0277993 A1 * 9/2019 Chen ......................... G01V 1/50

FOREIGN PATENT DOCUMENTS

| CN | 101329407 | * 12/2008 | .............. G01V 1/40 |
| CN | 103592680 | * 2/2014 | .............. G01V 1/28 |
| CN | 106873038 A | 6/2017 | |
| CN | 111208564 A | 5/2020 | |

* cited by examiner

*Primary Examiner* — Alexander Satanovsky

(57) ABSTRACT

A direct well-tie method for depth-domain logging and seismic data, including: removing null and outlier values from logging velocity data and logging density data to obtain valid logging velocity data and valid logging density data; calculating a logging reflection coefficient; estimating an initial zero-phase depth-domain seismic wavelet from seismic section; making a depth-domain synthetic seismogram; interpolating the depth-domain seismogram at the logging location; performing cross-correlating operation between the depth-domain synthetic seismogram and the interpolated depth-domain seismogram at the logging location; estimating a depth-domain seismic wavelet; updating the depth-domain synthetic seismogram; generating a corresponding depth deviation point set; subjecting elements in the set to interpolation to obtain a depth calibration curve; subjecting the depth calibration curve and depth axis to addition to obtain depth axis; generating a logging depth-seismic depth corresponding relationship and a depth-domain seismic wavelet.

1 Claim, 19 Drawing Sheets

Schematic diagram of calibration process

DIRECT WELL-TIE METHOD FOR DEPTH-DOMAIN LOGGING AND SEISMIC DATA

CROSS-REFERENCE TO RELATED APPLICATIONS

This application claims the benefit of priority from Chinese Patent Application No. 202210180144.4, filed on Feb. 25, 2022. The content of the aforementioned application, including any intervening amendments thereto, is incorporated herein by reference in its entirety.

TECHNICAL FIELD

This application relates to oil-gas seismic exploration, and more particularly to a direct well-tie method for depth-domain logging and seismic data.

BACKGROUND

During the geophysical logging process, various logging instruments manufactured on the basis of electricity, magnetism, sound, heat, and nuclear are deployed in the well to continuously collect a series of physical parameters varying with depth along the well, and variation curves of these physical parameters are plotted to help identify the subsurface lithology and mineral deposits such as oil, gas, water, coal, and metals. At the logging point, since the drill cores are obtained and the physical parameters are measured during logging, the underground geological conditions at this point are clearly understood. Currently, the seismic data obtained by artificial seismic exploration is mainly employed to infer the underground geological conditions of the site far from the logging point. The seismic data interpretation is to give the seismic data characteristics (such as reflection characteristics) a clear geological meaning and a conceptual model, so as to clarify the underground geological conditions. In the seismic data interpretation, the calibration of logging and seismic data not only plays a key role in correlating the subsurface geological conditions with observed seismic data, but also forms the foundations for the reliable stratigraphic interpretation and seismic inversion. The logging and seismic data calibration is performed through steps of: making a synthetic seismogram based on the velocity and density parameters obtained by logging, and aligning the obvious waveform features in the synthetic seismogram with the waveform features of the seismic data near the logging point (the alignment needs to be repeated many times), so as to correlate the features of the logging physical parameter curve with those of the seismic data to realize the extrapolation of geological conditions at the logging point, thereby inferring the subsurface geological conditions of a site far away from the logging point.

Since most of the seismic data employed for the previous interpretation are time-domain seismic data, it is required to convert the physical logging parameters varying with depth into physical logging parameters varying with time according to the logging velocity in the logging and seismic data calibration, and then synthesize the time-domain seismogram in the time domain based on the convolution model, so as to carry out calibration with the time-domain seismic data. Time-domain logging and seismic data calibration techniques have been well established. However, as the depth-domain seismic data with higher imaging accuracy of subsurface structures has been increasingly employed in the oil-gas seismic exploration, the seismic data interpretation is increasingly conducted relying on the depth-domain seismic data. The existing depth-domain logging and seismic data calibration technology corresponding to the depth-domain seismic data interpretation still remains to be improved. In the prior art, the depth-domain logging data and depth-domain seismic data are respectively converted into the time-domain logging data and time-domain seismic data to complete the calibration, and then the calibration results are converted back to the depth domain. Such calibration process is complex and requires multiple domain conversions, which will introduce conversion errors in the logging data and seismic data, resulting in low calibration accuracy, and even the matching of the logging data and seismic data at the wrong depth position.

SUMMARY

An objective of this application is to provide a direct well-tie method for depth-domain logging and seismic data, where a direct depth-domain seismogram synthesis method and a seismic wavelet estimation method are integrated in the calibration process, namely, there is no domain conversion in the seismogram synthesis and the seismic wavelet estimation. Therefore, the method provided herein can not only make full use of the logging information, but also avoid the accumulation of errors generated in the conversion between different domains and the data information loss brought by resampling (existing in the indirect method). In the method provided herein, a relatively accurate logging depth-seismic depth corresponding relationship can be established between the logging data and the seismic data through the first logging-seismic calibration, thereby reducing the number of subsequent local adjustments of the depth correspondence between the logging data and the seismic data.

Technical solutions of this application are described as follows.

This application provides a direct well-tie method for depth-domain logging and seismic data, comprising:

(1) removing null values and outlier values from logging velocity data and logging density data to obtain valid logging velocity data and valid logging density data;

(2) based on the valid logging velocity data and the valid logging density data, calculating a logging reflection coefficient r at different depths, expressed as:

$$r=[r(1), \ldots ,r(l), \ldots ,r(L)];$$

wherein L indicates the number of sampling points for the valid logging velocity data and the valid logging density data;

(3) estimating an initial zero-phase depth-domain seismic wavelet from a seismic section S, wherein the seismic section S is within a target depth range and passes through a well location, and the initial zero-phase depth-domain seismic wavelet is estimated through the steps of:

(3.1) calculating an average spectrum y of the seismic section S through the following equation:

$$y = \frac{1}{N}\sum_{n=1}^{N}(fft[S(n)])^2, n \in [1, 2, \ldots , N];$$

wherein fft[•] represents vector's fast Fourier transform; the seismic section S contains N seismograms in total; and S(n) indicates an n-th seismogram in the seismic section S, and contains M sampling points;

(3.2) building an objective function $$\min_{\alpha,\beta} \left\| \exp\left[-\left(\frac{K-\alpha}{\beta}\right)^2\right] - y \right\|_2 , \tag{5}$$

and solving the objective function by using least squares method to obtain a fitting parameter $\alpha$ and a fitting parameter $\beta$; wherein $\|\sqcap\|_2$ represents a vector L2 norm; $\exp[\bullet]$ represents a vector exponent; and a seismic wavenumber vector K is expressed as $K=[K(1), \ldots, K(m), \ldots, K(M)]$; wherein $$K(m) = \frac{(m-1)}{M\Delta D}, \tag{15}$$

a unit of $\alpha$ is 1/km; $\Delta D$ indicates a depth sampling interval of the seismic section S, a unit of $\Delta D$ is m; and a unit of each of the fitting parameter $\alpha$ and the fitting parameter $\beta$ is 1/km;

(3.3) constructing the initial zero-phase depth-domain seismic wavelet $w_0$ based on the fitting parameter $\beta$ and a logging wavenumber vector k, expressed as follows:

$$w_0 = \frac{(45\pi - 128)k^2}{9\pi\beta^2} \exp\left[-\left(\frac{(45\pi - 128)k^2}{18\pi\beta^2}\right) + 1\right]; \tag{30}$$

wherein $k=[k(1), \ldots, k(l), \ldots, k(L)]$;

$$k(l) = \frac{(l-1)}{L\Delta d}, \tag{35}$$

and $\Delta d$ indicates a depth sampling interval of logging data, with a unit of m;

(4) making a depth-domain synthetic seismogram A based on the initial zero-phase depth-domain seismic wavelet $w_0$ and a logging reflection coefficient r, expressed as follows:

$$A=\text{real}\{\overline{P}[rP]\odot w_0]\}; \tag{45}$$

wherein real$\{\bullet\}$ denotes an operation of taking a vector real part; $\odot$ represents a vector Hadamard product; P is an L-order matrix; $\overline{P}$ is a conjugate matrix of the P; and an element P(l,l) in the P is expressed as follows:

$$P(l,l) = \frac{P(l-1,l)}{L} \exp\left[-\frac{i2\pi(l-1)v_{max}}{v(l)L}\right]; \tag{55}$$

wherein $i=\sqrt{-1}$ is an imaginary unit; and $v_{max}$ is a maximum value in the valid logging velocity data v; a unit of v is m/s; at this time, a depth axis $D^A$ corresponding to the depth-domain synthetic seismogram A is expressed as: $D^A=[D^A(1), \ldots, D^A(l), \ldots, D^A(L)]$; wherein $D^A(1)$ is an initial depth of a depth-domain seismogram at the well location;

(5) according to the depth sampling interval $\Delta d$ of the logging data, subjecting the depth-domain seismogram at the well location to interpolation by using a cubic spline interpolation method to obtain an interpolated depth-domain seismogram at the well location;

(6) performing cross-correlation operation between the depth-domain synthetic seismogram A and the interpolated depth-domain seismogram at the well location to obtain a cross-correlation result; updating the depth axis $D^A$ corresponding to the depth-domain synthetic seismogram A into $D^A=D^A+[D_0-D^A(1)]$ according to a depth position $D_0$ corresponding to a maximum value in the cross-correlation result; at the same time, starting from $D_0$, extracting L sampling points from the interpolated depth-domain seismogram at the well location to obtain a depth-domain seismogram segment B; wherein a depth axis $D^B$ corresponding to the depth-domain seismogram segment B is expressed as $D^B=[D^B(1), \ldots, D^B(l), \ldots, D^B(L)]$;

(7) based on the depth-domain seismogram segment B and the logging reflection coefficient r, estimating a depth-domain seismic wavelet by using a direct depth-domain seismic wavelet estimation method; based on the depth-domain seismic wavelet and the logging reflection coefficient r, updating the depth-domain synthetic seismogram A by using a direct depth-domain seismogram synthesis method to obtain a depth-domain synthetic seismogram A';

(8) selecting a wave peak or trough position from the depth-domain seismogram segment B, wherein the wave peak or trough position is similar to the depth-domain synthetic seismogram A' in waveform characteristic; compressing or stretching the depth-domain seismogram segment B to align the wave peak or trough position with the depth-domain synthetic seismogram A', and generating a corresponding depth deviation point set E, expressed as follows:

$$E=\{E(1), \ldots, E(j), \ldots, E(J)\}, J<L;$$

wherein $E(j)=D^B(j)-D^{A'}(j)$, representing a depth axis difference between the depth-domain seismogram segment B and the depth-domain synthetic seismogram A' at a j-th point; and subjecting elements in the depth deviation point set E to interpolation by using the cubic spline interpolation method to obtain a depth calibration curve C;

(9) subjecting the depth calibration curve C and the depth axis $D^{A'}$ to addition to obtain a depth axis $D^{A''}=D^{A'}+C$, and subjecting the depth calibration curve C and the depth axis $D^B$ to addition to obtain a depth axis $D^{B'}=D^B+C$; according to the depth axis $D^{B'}$, intercepting a corresponding depth-domain seismogram segment B' from the interpolated depth-domain seismogram at the well location; and repeating step (7); and

(10) determining whether the depth-domain seismogram segment B' is aligned with the depth-domain synthetic seismogram A' at the wave peak or trough position, and a correlation coefficient between the depth-domain seismogram segment B' and the depth-domain synthetic seismogram A' is higher than a correlation coefficient in a previous calibration process; if yes, completing a calibration operation, and generating a logging depth-seismic depth corresponding relationship and a depth-domain seismic wavelet; otherwise, repeating steps (8)-(9).

BRIEF DESCRIPTION OF THE DRAWINGS

FIG. 2a shows comparison between the depth-domain synthetic seismogram made based on an initial depth-domain seismic wavelet shown in FIG. 2f and the logging reflection coefficient, and the depth-domain seismogram at the logging location; where at this time, the depth-domain synthetic seismogram is the same as the depth-domain seismogram at the logging location in initial depth;

FIG. 2b shows variation on an initial depth in the depth-domain synthetic seismogram, and shows that after cross-correlation between the depth-domain synthetic seismogram and the whole depth-domain seismogram at the logging location, a depth (2941.2 m) corresponding to the maximum value in the cross-correlation results is taken as an initial depth of the depth-domain synthetic seismogram; at the same time, a depth-domain seismogram segment at the logging location (marked with a gray dotted line in a gray area) is intercepted from the depth (2941.2 m);

FIG. 2c shows comparison between the depth-domain synthetic seismogram, which is made based on the depth-domain seismic wavelet shown in FIG. 2g and the logging reflection coefficient, and the depth-domain seismogram at the logging location; where, a wave peak or trough position in the depth-domain seismogram segment at the logging location that is similar to the depth-domain synthetic seismogram in waveform and has a larger absolute amplitude is selected (as shown in FIG. 3a); by compressing or stretching the depth-domain seismogram segment at the logging location, the selected wave peak or trough position is aligned with the depth-domain synthetic seismogram to generate corresponding depth deviation points (marked with black points shown in FIG. 3b); according to the depth deviation points, a depth correction curve is generated (a black curve in FIG. 3b), and used to update depth axis of the depth-domain synthetic seismogram and the depth-domain seismogram segment at the logging location, and a depth-domain seismogram segment at the logging location is intercepted;

FIG. 2d shows comparison between the depth-domain synthetic seismogram, which is made based on the depth-domain seismic wavelet shown in FIG. 2h and the logging reflection coefficient, and the depth-domain seismogram at the logging location;

FIG. 2e shows comparison between the depth-domain synthetic seismogram, which is made based on the depth-domain seismic wavelet shown in FIG. 2i and the logging reflection coefficient, and the depth-domain seismogram at the logging location; where at this time, the depth-domain seismogram segment at the logging location is aligned with the depth-domain synthetic seismogram at the wave peak or trough position, and a correlation coefficient between the depth-domain seismogram segment at the logging location and the depth-domain synthetic seismogram is higher than that in the previous calibration process, indicating completion of the calibration;

FIG. 2f shows the initial depth-domain seismic wavelet;

FIG. 2g shows a depth-domain seismic wavelet, which is estimated based on the intercepted depth-domain seismogram segment at the logging location in FIG. 2b, and the logging reflection coefficient;

FIG. 2h shows a depth-domain seismic wavelet, which is estimated based on the updated depth-domain seismogram segment at the logging location in FIG. 2c, and the logging reflection coefficient;

FIG. 2i shows a depth-domain seismic wavelet, which is estimated based on the updated depth-domain seismogram segment at the logging location in FIG. 2d, and the logging reflection coefficient;

FIG. 3a shows comparison between the depth-domain synthetic seismogram (black solid line in FIG. 2c) and the depth-domain seismogram segment (gray dotted line in FIG. 2c) at the logging location in the gray area in FIG. 2c, where black marked points on two curves refer to wave peaks or wave troughs needed to be aligned;

FIG. 3b shows a depth calibration curve (marked with dark solid line), which is plotted through steps of: compressing or stretching the depth-domain seismogram segment at the logging location shown in FIG. 3a to align the selected wave peak or trough positions with the depth-domain synthetic seismogram; and subjecting the generated depth deviation points to interpolation by means of cubic spline interpolation method to obtain the depth calibration curve;

FIG. 3c shows comparison between the depth-domain seismogram segment at the logging location and the depth-domain synthetic seismogram after the selected wave peak or trough positions are aligned, where the depth-domain seismogram segment at the logging location and the depth-domain synthetic seismogram are better matched in the waveform characteristics.

DETAILED DESCRIPTION OF EMBODIMENTS

Figure 1A:
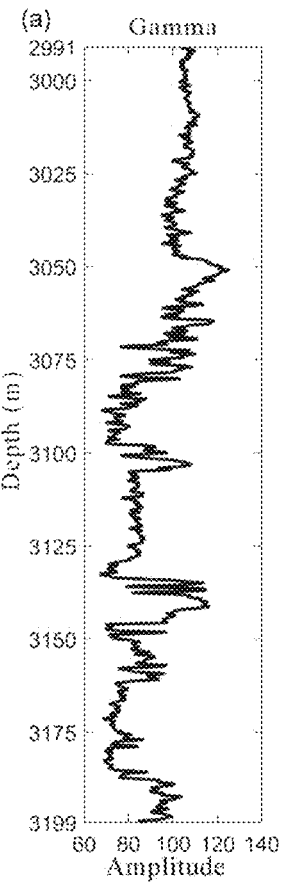
FIGS. 1a-1c respectively show gamma data (dimensionless unit), density data (g/cm³) and velocity data (m/s) of valid logging data according to an embodiment of this application, where a depth range of the valid logging data is 2991-3199.2 m, and a depth sampling interval of the valid logging data is 0.15 m.
Figure 1B:
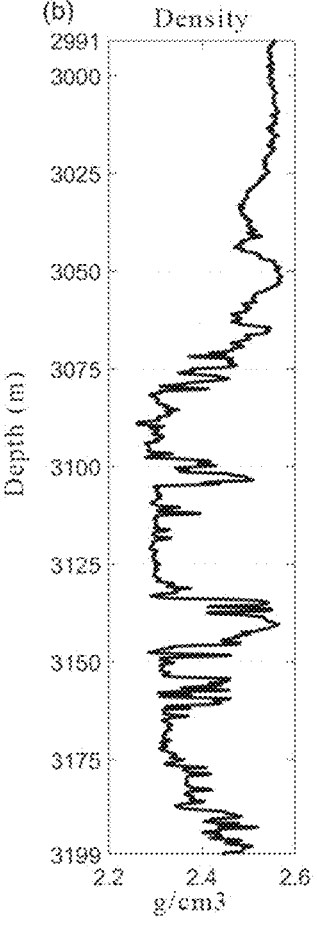
Figure 1C:
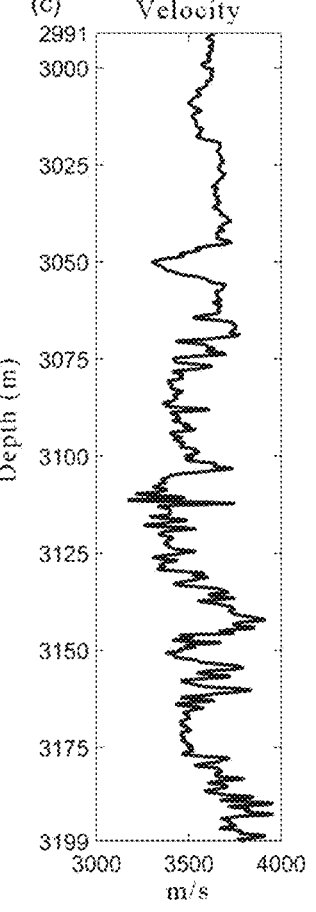
Figure 1D:
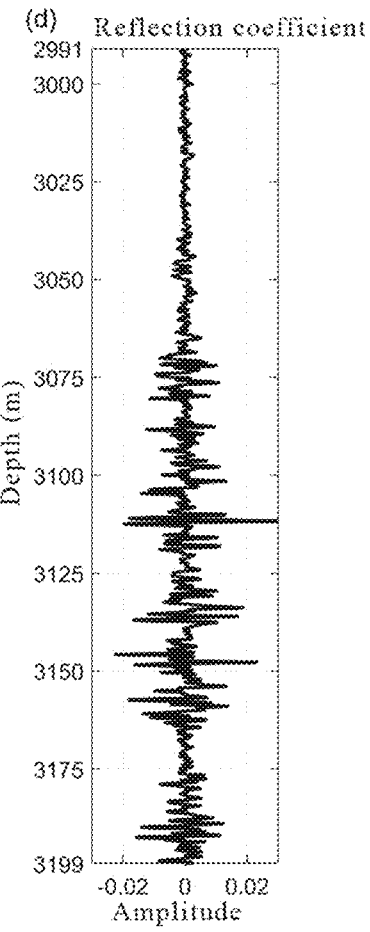
FIGS. 1d-1e respectively show a depth-domain logging reflection coefficient (dimensionless unit) and a depth-domain seismogram at the logging location corresponding to the valid logging data, where a depth range of the depth-domain logging reflection coefficient is 2991-3199.2 m, and a depth sampling interval of the depth-domain logging reflection coefficient is 0.15 m; and a depth range of the depth-domain seismogram at the logging location is 2400-3895 m, and a depth sampling interval of the depth-domain seismogram at the logging location is 5 m.
Figure 1E:
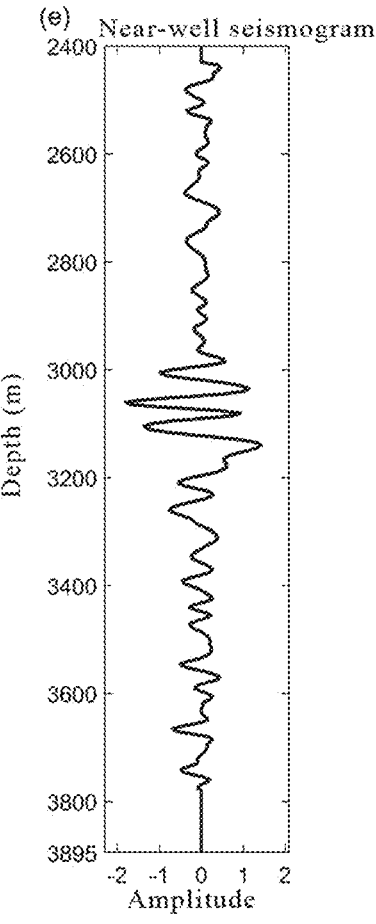

FIGS. 2a-2i schematically shows a process of calibrating logging data and depth-domain seismogram (shown in FIG. 1e) at the logging location, which is performed through the following steps.

(1) Null values and outlier values are removed from logging velocity data and logging density data to obtain valid logging velocity data v and valid logging density data ρ, where the logging velocity data is collected by means of a velocity sensor, and the logging density data is collected through a density sensor.

(2) Based on the valid logging velocity data v and the valid logging density data ρ, a logging reflection coefficient r at different depths, which is expressed as follows:

$$r=[r(1), \ldots ,r(l), \ldots ,r(L)];$$

where $$r(l) = \frac{v(l+1)\rho(l+1) - v(l)\rho(l)}{v(l+1)\rho(l+1) + v(l)\rho(l)},$$

and L=1389 and L indicates the number of sampling points for the valid logging velocity data v and the valid logging density data ρ.

(3) An initial zero-phase depth-domain seismic wavelet is estimated from a seismic section S, where the seismic section S is within a target depth ranging from 2800 m to 3400 m and passes through an inline direction of a well location. The initial zero-phase depth-domain seismic wavelet is estimated through the following steps.

(3.1) An average spectrum y of the seismic section S is calculated through the following equation:

$$y = \frac{1}{N}\sum_{n=1}^{N} (fft[S(n)])^2, \quad n \in [1, 2, \ldots, N];$$

where fft[•] represents a vector's fast Fourier transform, the seismic section S contains a total of N=965 seismograms, and S(n) indicates an n-th seismogram in the seismic section S, and contains M=121 sampling points;

(3.2) An objective function $$\min_{\alpha,\beta} \left\| \exp\left[-\left(\frac{K-\alpha}{\beta}\right)^2\right] - y \right\|_2$$

is built and solved by using least squares method to obtain a fitting parameter α and a fitting parameter β. In the objective function, $\| \cdot \|_2$ represents a vector L2 norm; exp[•] represents a vector exponent; and a seismic wavenumber vector K is expressed as K=[K(1), . . . , K(m), . . . , K(M)], where $$K(m) = \frac{(m-1)}{M\Delta D};$$

ΔD indicates a depth sampling interval of the seismic section S, and ΔD=5 m; and a unit of each of the fitting parameter α and the fitting parameter β is 1/km.

(3.3) The initial zero-phase depth-domain seismic wavelet $w_0$ is constructed based on the fitting parameter β and a logging wavenumber vector k, expressed as follows:

$$w_0 = \frac{(45\pi - 128)k^2}{9\pi\beta^2}\exp\left[-\left(\frac{(45\pi - 128)k^2}{18\pi\beta^2}\right) + 1\right];$$

where k=[k(1), . . . , k(l), . . . , k(L)], $$k(l) = \frac{(l-1)}{L\Delta d}$$

and Δd indicates a depth sampling interval of logging data, and Δd=0.15 m.

(4) A depth-domain synthetic seismogram A is made based on the initial zero-phase depth-domain seismic wavelet $w_0$ and a logging reflection coefficient r, expressed as follows:

$$A=real\{\overline{P}[(rP)\odot w_0]\};$$

where real{•} denotes an operation of taking a vector real part; ⊙ represents a vector Hadamard product; P is an L-order matrix; $\overline{P}$ is a conjugate matrix of the P; and an element P(l,l) in the P is expressed as follows:

$$P(l, l) = \frac{P(l-1, l)}{L}\exp\left[-\frac{i2\pi(l-1)v_{max}}{v(l)L}\right];$$

where i=$\sqrt{-1}$ is an imaginary unit; and $v_{max}$ is a maximum value in the valid logging velocity data v, and $v_{max}$=3954.2 m/s; at this time, a depth axis $D^A$ corresponding to the depth-domain synthetic seismogram A is expressed as: $D^A$=[$D^A$(1), . . . , $D^A$(l), . . . , $D^A$ (L)], where $D^A$ (1) is an initial depth of a depth-domain seismogram at the well location, and $D^A$ (1)=2400 m.

(5) According to the depth sampling interval of the logging data, the depth-domain seismogram at the well location is subjected to interpolation by using a cubic spline interpolation method to obtain an interpolated depth-domain seismogram at the logging location.

(6) Cross-correlation operation between the depth-domain synthetic seismogram A and the interpolated depth-domain seismogram at the logging location is performed to obtain a cross-correlation result. The depth axis $D^A$ corresponding to the depth-domain synthetic seismogram A is updated into $D^A$=$D^A$+[$D_0$−$D^A$(1)], according to a depth position $D_0$ (i.e., 2941.2 m) corresponding to a maximum value in the cross-correlation result. At the same time, starting from $D_0$, L sampling points are extracted from the interpolated depth-domain seismogram at the logging location to obtain a depth-domain seismogram segment B, where a depth axis $D^B$ corresponding to the depth-domain seismogram segment B is expressed as $D^B=[D^B(1), \ldots, D^B(l), \ldots, D^B(L)]$.

(7) Based on the depth-domain seismogram segment B and the logging reflection coefficient r, a depth-domain seismic wavelet is estimated by using a model-based depth-domain seismic wavelet estimation method (referring to a method disclosed by Chinese Patent Application No. 202010504205.9). Based on the depth-domain seismic wavelet and the logging reflection coefficient r, the depth-domain synthetic seismogram A is updated by using a direct depth-domain seismogram synthesis method (referring to a method disclosed by Chinese Patent Application No. 202010504205.9) to obtain a depth-domain synthetic seismogram A'.

Figure 3A:
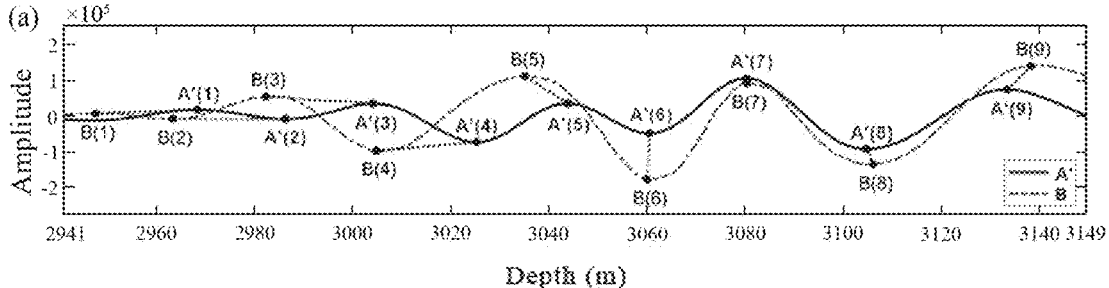
FIGS. 3a-c schematically show a calibration corresponding to FIG. 2c.

(8) A wave peak or trough position is selected from the depth-domain seismogram segment B, where the wave peak or trough position is similar to a corresponding wave peak or trough position in the depth-domain synthetic seismogram A' in waveform characteristic, and has a large absolute amplitude (as shown in FIG. 3a). The depth-domain seismogram segment B is compressed and stretched to align the wave peak or trough position with the corresponding wave peak or trough position in the depth-domain synthetic seismogram A', and a corresponding depth deviation point set E (shown as black mark points in FIG. 3b) is generated, which is expressed as follows:

$$E=\{E(1), \ldots, E(j), \ldots, E(J)\}, J<L;$$

where $E(j)=D^B(j)-D^{A'}(j)$, representing a depth axis difference between the depth-domain seismogram segment B and the depth-domain synthetic seismogram A' at a j-th point.

Specifically, the "wave peak or trough position" is determined based on the combination of visual observation and correlation coefficient. Whether the depth-domain seismogram segment B is aligned with the depth-domain synthetic seismogram A' is determined by human-computer interaction, and then the correlation coefficient is introduced to evaluate the similarity to select the desired wave peak or trough in the depth-domain seismogram segment B.

Figure 3B:
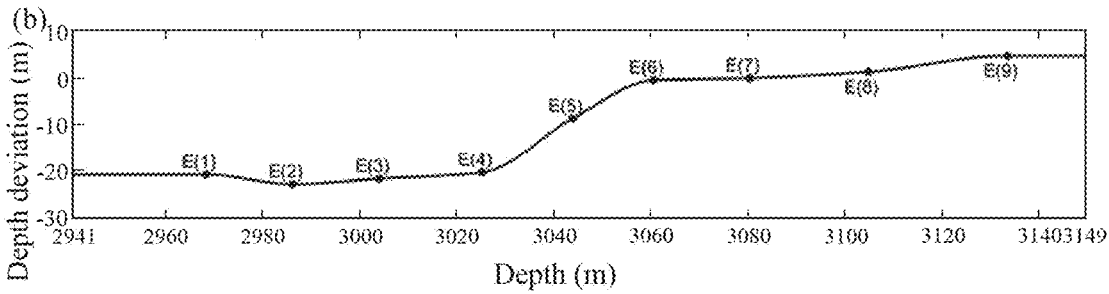

Elements in the depth deviation point set E are subjected to interpolation by using the cubic spline interpolation method to obtain a depth calibration curve C (shown as black solid line in FIG. 3b).

Figure 3C:
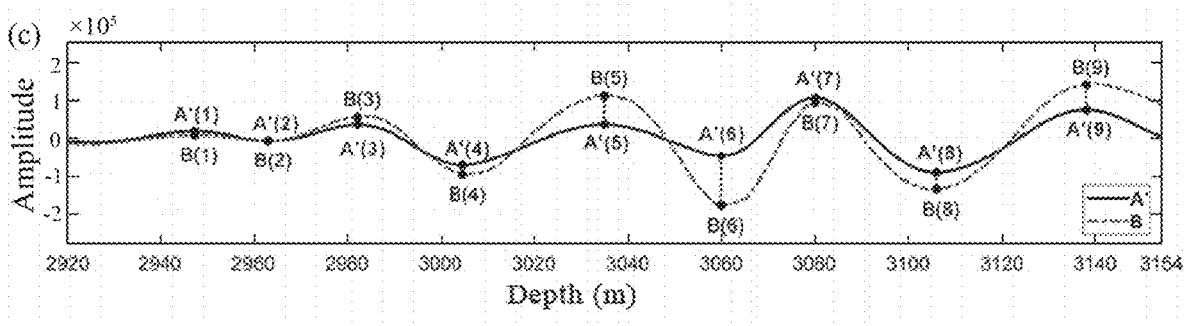

(9) The depth calibration curve C and the depth axis $D^{A'}$ are subjected to addition to obtain a depth axis $D^{A''}=D^{A'}+C$, and the depth calibration curve C and the depth axis $D^B$ are subjected to addition to obtain a depth axis $D^{B'}=D^B+C$. According to the depth axis $D^{B'}$ (as shown in the abscissa in FIG. 3c), a corresponding depth-domain seismogram segment B' is intercepted from the interpolated depth-domain seismogram at the logging location. Step (7) is repeated.

Figure 2A:
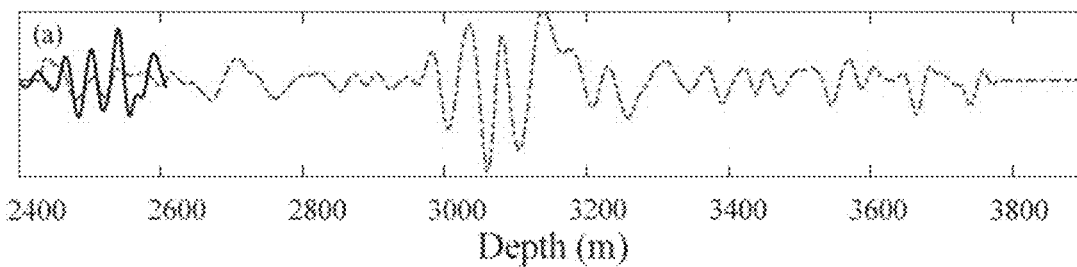
FIGS. 2a-i schematically show a calibration process for the valid logging data and the corresponding depth-domain seismogram at the logging location (marked with a gray dashed line) according to an embodiment of this application, where in FIGS. 2a-e, a solid black line represents a depth-domain synthetic seismogram.
Figure 2B:
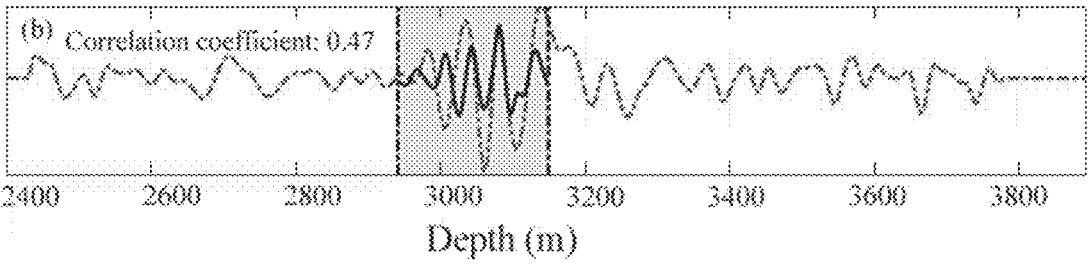
Figure 2C:
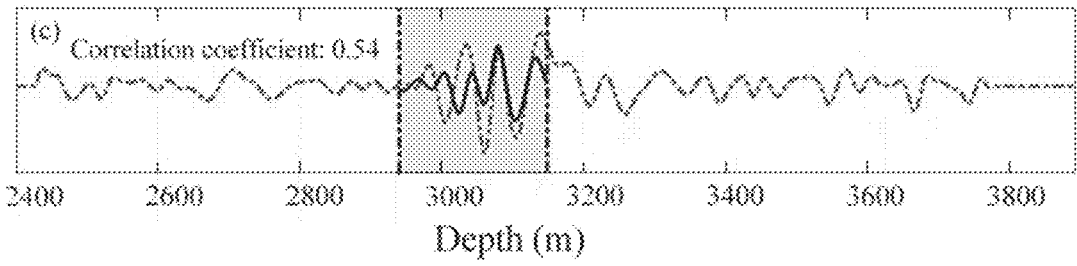
Figure 2D:
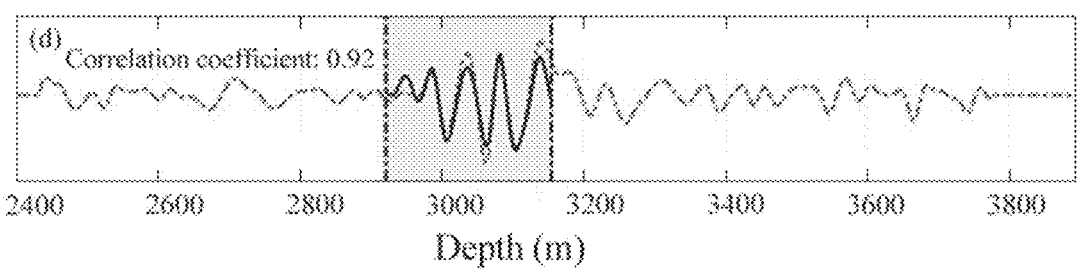
Figure 2E:
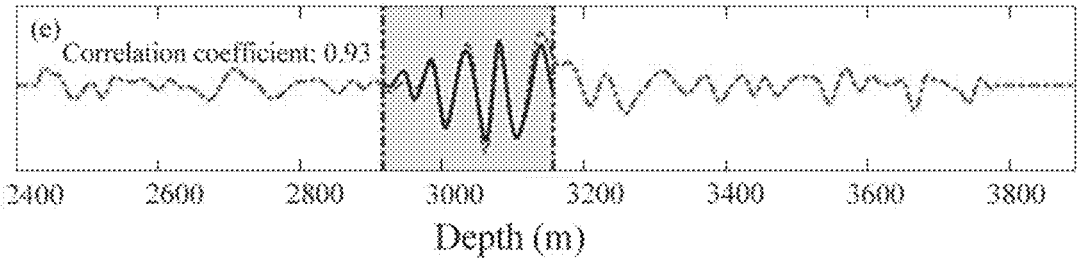
Figure 2F:
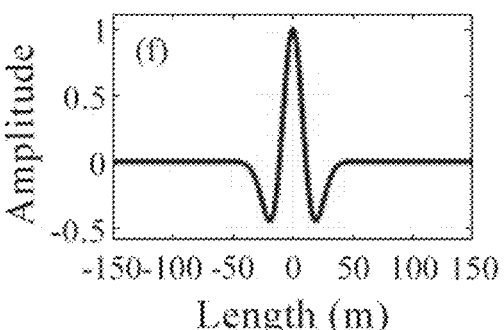
Figure 2G:
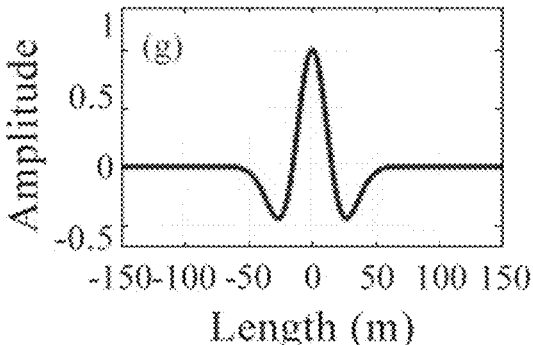
Figure 2H:
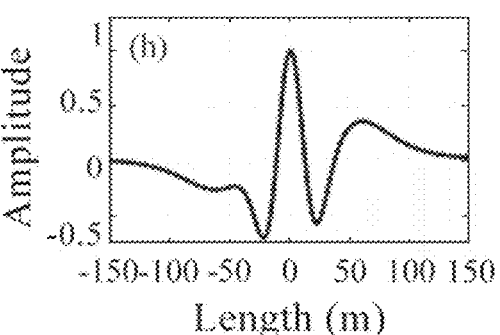

(10) Whether the depth-domain seismogram segment B' is aligned with the depth-domain synthetic seismogram A' at the wave peak or trough position, and a correlation coefficient between the depth-domain seismogram segment B' and the depth-domain synthetic seismogram A' is higher than a correlation coefficient in a previous calibration process (as shown in FIG. 2e) is determined. If yes, a calibration operation is completed, and a logging depth-seismic depth corresponding relationship and a depth-domain seismic wavelet are generated; otherwise, steps (8)-(9) are repeated.

Figure 2I:
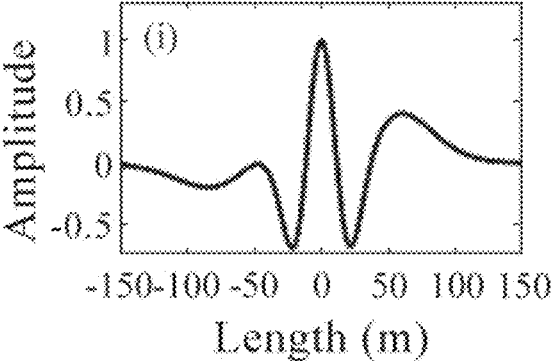
Figure 4:
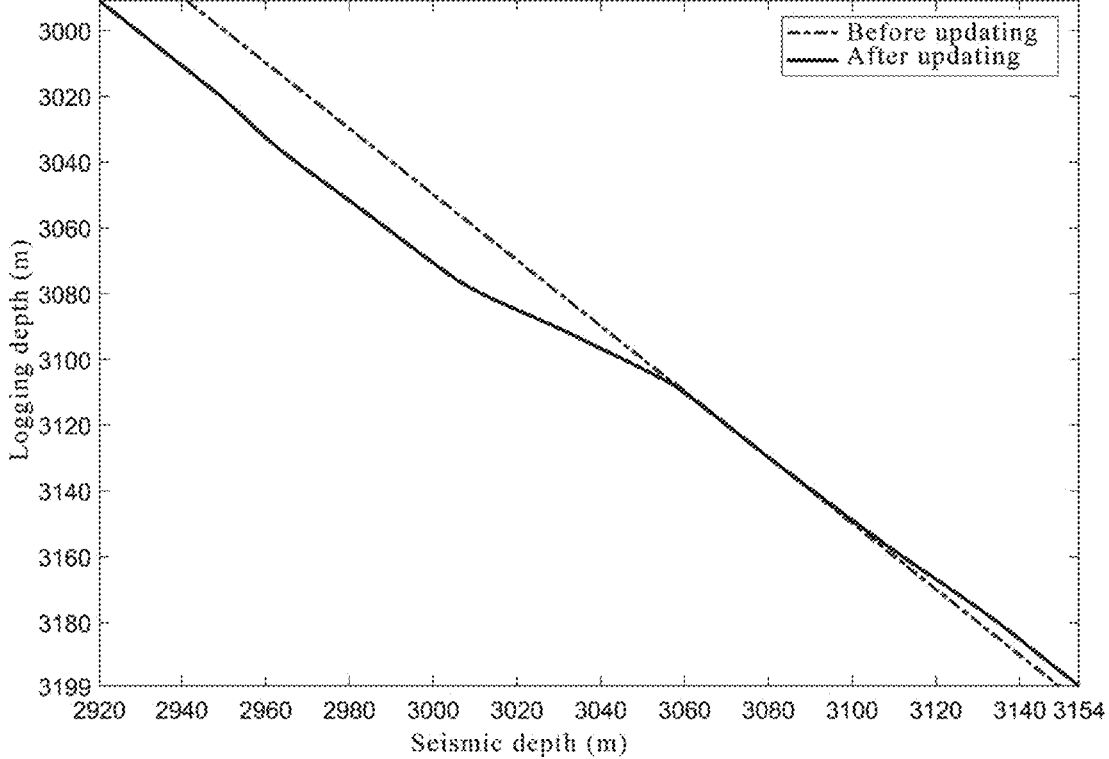
FIG. 4 is a schematic diagram of updating a corresponding relationship between logging depth and seismic depth corresponding to FIGS. 3a-c, where an ordinate indicates the logging depth (m), and an abscissa indicates the seismic depth (m); a gray dotted line corresponds to a corresponding relationship between the logging depth and the seismic depth before addition of the depth calibration curve; at this time, a logging depth ranging from 2991 m to 3199.2 m corresponds to a seismic depth ranging from 2941.2 m to 3149.4 m; a black solid line corresponds to a corresponding relationship between the logging depth and the seismic depth after addition of the depth calibration curve; at this time, a logging depth ranging from 2991 m to 3199.2 m corresponds to the seismic depth ranging from 2920.3 m to 3154.2 m.

It can be concluded that after the logging data and the depth-domain seismogram are subjected to calibration operation by using the method provided herein for two times (shown in FIGS. 2c and 2d), a reasonable logging depth-seismic depth corresponding relationship (shown in FIG. 4) and a depth-domain seismic wavelet are obtained (shown in FIG. 2i).

Figure 5:
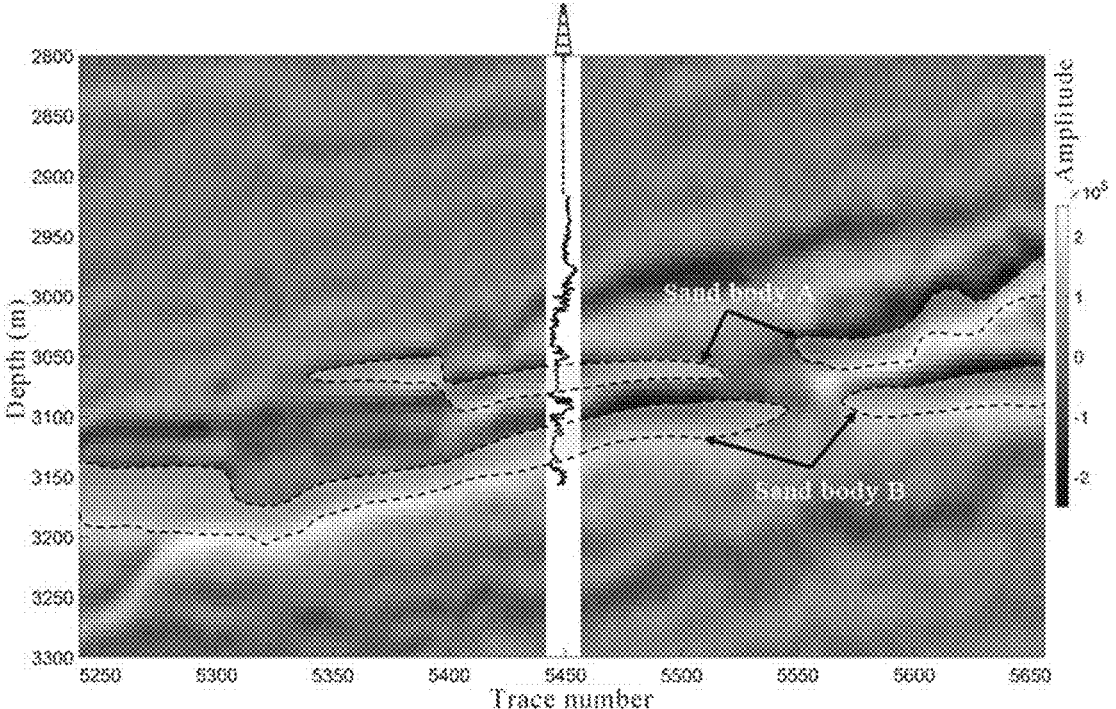
FIG. 5 shows a depth-domain seismic section located in a target depth section and passing through an inline direction of the logging position according to an embodiment of this application, where an ordinate indicates a depth (m), an abscissa indicates a channel number (dimensionless), and a color bar represents an amplitude of seismic data (dimensionless), the darker the color, the smaller the amplitude value, and vice versa; the depth of the depth-domain seismic section ranges from 2800 m to 3300 m with a depth sampling interval of 5 m; the logging position is located at channel No. 5449 of the section, and the logging curve shown in the section is a Gamma Ray curve; in addition, two sets of sand bodies predicted based on the existing geological knowledge and logging information of the working area are also marked on the section.

The Gamma Ray logging curve can be employed for lithology classification and location. For the sand and mudstone section, the pure sandstone has the lowest Gamma value, and the Gamma value rises with the increase of shale content. The Gamma Ray logging curve is projected onto the seismic section image based on the obtained logging depth-seismic depth corresponding relationship through the execution of a computer program on a processor. Referring to the through-well depth-domain seismic section shown in FIG. 5, low-value areas in the Gamma Ray logging curve are consistent with the two sets of sand bodies (predicted based on the available geological knowledge and available logging information), indicating that the method provided herein is effective and reliable, especially in the location of sand bodies (e.g., sandstone, which is applicable to the oil-gas exploration). By projecting the Gamma Ray logging curve onto the seismic section image based on the logging depth-seismic depth corresponding relationship obtained by the method provided herein, the logging data is introduced to predict the underground medium in a larger three-dimensional (3D) space, facilitating the generation of geological models (applied to the identification of geological characteristics and reservoir properties of oil and gas reservoirs, and calculation of oil and gas reserves) and location of sand bodies.

The depth-domain seismic wavelet obtained by the method provided herein is applicable to the subsequent seismic inversion to output an elastic impedance image of the underground medium.

Compared with the prior art, this application has the following beneficial effects.

In this application, a direct depth-domain seismogram synthesis method and a seismic wavelet estimation method are integrated in the calibration process, which can not only make full use of the logging information, but also avoid the accumulation of errors generated in the conversion between different domains (such as depth domain and time domain) and the data information loss brought by resampling (existing in the indirect method). In the method provided herein, a relatively accurate depth corresponding relationship can be established between the logging data and the seismic data through the first logging-seismic calibration, thereby reducing the number of subsequent local adjustments for the depth correspondence between the logging data and the seismic data. The logging depth-seismic depth corresponding relationship established based on the method provided herein can be employed in the building of a more accurate low-frequency (below 10 Hz) geological background model, which is further used for the identification of geological characteristics and reservoir properties of oil and gas reservoirs, and calculation of oil and gas reserves. Moreover, based on the logging depth-seismic depth corresponding relationship, the logging data and the seismic section image can be combined to locate the sand bodies (e.g., sandstone) in terms of depth and profile.

The above-mentioned embodiments are only illustrative of this application, and are not intended to limit this application. It should be understood that various variations, modifications and improvements made by those skilled in the art without departing from the spirit of this application shall fall within the scope of the present application defined by the appended claims.

What is claimed is:

1. A method for locating an oil-gas reservoir based on direct well-tie of depth-domain logging and seismic data, comprising:

(1) removing null values and outlier values from logging velocity data and logging density data to obtain valid logging velocity data and valid logging density data;

(2) based on the valid logging velocity data and the valid logging density data, calculating a logging reflection coefficient r at different depths, expressed as:

$$r=[r(1), \ldots ,r(l), \ldots ,r(L)];$$

wherein L indicates the number of sampling points for the valid logging velocity data and the valid logging density data;

(3) estimating an initial zero-phase depth-domain seismic wavelet from a seismic section S, wherein the seismic section S is within a target depth range and passes through a well location, and the initial zero-phase depth-domain seismic wavelet is estimated through steps of:

(3.1) calculating an average spectrum y of the seismic section S through the following equation:

$$y = \frac{1}{N}\sum_{n=1}^{N}(fft[S(n)])^2, n \in [1, 2, \ldots , N];$$

wherein fft[•] represents vector's fast Fourier transform; the seismic section S contains N seismograms in total; and S(n) indicates an n-th seismogram in the seismic section S, and contains M sampling points;

(3.2) building an objective function $$\min_{\alpha,\beta}\left\|\exp\left[-\left(\frac{K-\alpha}{\beta}\right)^2\right]-y\right\|_2,$$

and solving the objective function by using least squares method to obtain a fitting parameter $\alpha$ and a fitting parameter $\beta$; wherein $\|\cdot\|_2$ represents a vector L2 norm; exp[•] represents a vector exponent; and a seismic wavenumber vector K is expressed as K=[K(1), \ldots , K(m), \ldots , K(M)]; wherein $$K(m) = \frac{(m-1)}{M\Delta D};$$

and $\Delta D$ indicates a depth sampling interval of the seismic section S;

(3.3) constructing the initial zero-phase depth-domain seismic wavelet $w_0$ based on the fitting parameter $\beta$ and a logging wavenumber vector k, expressed as follows:

$$w_0 = \frac{(45\pi - 128)k^2}{9\pi\beta^2}\exp\left[-\left(\frac{(45\pi - 128)k^2}{18\pi\beta^2}\right)+1\right];$$

wherein k=[k(1), \ldots , k(l), \ldots , k(L)];

$$k(l) = \frac{(l-1)}{L\Delta d}$$

and $\Delta d$ cates a depth sampling interval of logging data;

(4) making a depth-domain synthetic seismogram A based on the initial zero-phase depth-domain seismic wavelet $w_0$ and a logging reflection coefficient r, expressed as follows:

$$A=\text{real}\{\overline{P}[rP]\odot w_0]\};$$

wherein real{•} denotes an operation of taking a vector real part; $\odot$ represents a vector Hadamard product; P is an L-order matrix; $\overline{P}$ is a conjugate matrix of the P; and an element P(l,l) in the P is expressed as follows:

$$P(l, l) = \frac{P(l-1, l)}{L}\exp\left[-\frac{i2\pi(l-1)v_{max}}{v(l)L}\right];$$

wherein $i=\sqrt{-1}$ is an imaginary unit; and $v_{max}$ is a maximum value in the valid logging velocity data; at this time, a depth axis $D^A$ corresponding to the depth-domain synthetic seismogram A is expressed as: $D^A=[D^A(1), \ldots , D^A(l), \ldots , D^A(L)]$; wherein $D^A(1)$ is an initial depth of a depth-domain seismogram at the well location;

(5) according to the depth sampling interval $\Delta d$ of the logging data, subjecting the depth-domain seismogram at the well location to interpolation by using a cubic spline interpolation method to obtain an interpolated depth-domain seismogram at the well location;

(6) performing cross-correlation operation between the depth-domain synthetic seismogram A and the interpolated depth-domain seismogram at the well location to obtain a cross-correlation result; updating the depth axis $D^A$ corresponding to the depth-domain synthetic seismogram A into $D^{A'}=D^A+[D_0-D^A(1)]$ according to a depth position $D_0$ corresponding to a maximum value in the cross-correlation result; at the same time, starting from $D_0$, extracting L sampling points from the interpolated depth-domain seismogram at the well location to obtain a depth-domain seismogram segment B; wherein a depth axis $D^B$ corresponding to the depth-domain seismogram segment B is expressed as $D^B=[D^B(1), \ldots , D^B(l), \ldots , D^B(L)]$;

(7) based on the depth-domain seismogram segment B and the logging reflection coefficient r, estimating a depth-domain seismic wavelet by using a direct depth-domain seismic wavelet estimation method; based on the depth-domain seismic wavelet and the logging reflection coefficient r, updating the depth-domain synthetic seismogram A by using a direct depth-domain seismogram synthesis method to obtain a depth-domain synthetic seismogram A';

(8) selecting a wave peak or trough position from the depth-domain seismogram segment B, wherein the wave peak or trough position is similar to the depth-domain synthetic seismogram A' in waveform characteristic; compressing or stretching the depth-domain seismogram segment B to align the wave peak or trough position with the depth-domain synthetic seismogram A', and generating a corresponding depth deviation point set E, expressed as follows:

$$E=\{E(1),\ \ldots\ ,E(j),\ \ldots\ ,E(J)\},J<L;$$

wherein $E(j)=D^B(j)-D^{A'}(j)$, representing a depth axis difference between the depth-domain seismogram segment B and the depth-domain synthetic seismogram A' at a j-th point; and subjecting elements in the depth deviation point set E to interpolation by using the cubic spline interpolation method to obtain a depth calibration curve C;

(9) subjecting the depth calibration curve C and the depth axis $D^{A'}$ to addition to obtain a depth axis $D^{A''}=D^{A'}+C$, and subjecting the depth calibration curve C and the depth axis $D^B$ to addition to obtain a depth axis $D^{B'}=D^B+C$; according to the depth axis $D^{B'}$, intercepting a corresponding depth-domain seismogram segment B' from the interpolated depth-domain seismogram at the well location; and repeating step (7);

(10) determining whether the depth-domain seismogram segment B' is aligned with the depth-domain synthetic seismogram A' at the wave peak or trough position, and a correlation coefficient between the depth-domain seismogram segment B' and the depth-domain synthetic seismogram A' is higher than a correlation coefficient in a previous calibration process; if yes, completing a calibration operation, and generating a logging depth-seismic depth corresponding relationship and a depth-domain seismic wavelet; otherwise, repeating steps (8)-(9); and

(11) projecting a Gamma Ray logging curve onto the seismic section S based on the logging depth-seismic depth corresponding relationship to output a first image;

subjecting the depth-domain seismic wavelet to seismic inversion to output a second image, wherein the second image is an elastic impedance image of an underground medium; and locating, for a user, the oil-gas reservoir based on the first image and the second image.

* * * * *